United States Patent
Hermann et al.

(10) Patent No.: US 7,934,765 B2
(45) Date of Patent: May 3, 2011

(54) TOP FOR A CONVERTIBLE

(75) Inventors: Felix Hermann, Leonberg (DE); Dominik Beierl, Korntal-Münchingen (DE); Lars Schulz, Schöneiche (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 81 days.

(21) Appl. No.: 12/536,915

(22) Filed: Aug. 6, 2009

(65) Prior Publication Data

US 2010/0001549 A1    Jan. 7, 2010

Related U.S. Application Data

(63) Continuation-in-part of application No. 11/852,405, filed on Sep. 10, 2007, now abandoned.

(30) Foreign Application Priority Data

Sep. 8, 2006 (DE) .......................... 10 2006 042 289

(51) Int. Cl.
B60J 7/14 (2006.01)

(52) U.S. Cl. ......... 296/107.16; 296/146.14; 296/107.15; 296/107.17; 296/108

(58) Field of Classification Search ............. 296/146.14, 296/107.07, 107.09, 107.11, 107.15, 107.16, 296/107.17, 108, 116, 117, 118, 121
See application file for complete search history.

(56) References Cited

U.S. PATENT DOCUMENTS

| | | | |
|---|---|---|---|
| 5,669,656 A | 9/1997 | Aydt et al. | |
| 6,030,022 A | 2/2000 | Bormann et al. | |
| 6,209,945 B1 * | 4/2001 | Aydt et al. | 296/120.1 |
| 6,561,565 B2 | 5/2003 | Langguth et al. | |
| 6,572,175 B2 | 6/2003 | Schütt et al. | |
| 6,796,596 B2 * | 9/2004 | Fischer | 296/107.12 |
| 6,843,522 B2 | 1/2005 | Lange | |
| 7,032,951 B2 | 4/2006 | Powell | |
| 7,172,235 B2 | 2/2007 | Roesler et al. | |
| 7,631,923 B2 * | 12/2009 | Beierl et al. | 296/116 |
| 7,641,258 B2 * | 1/2010 | Beierl et al. | 296/107.09 |
| 7,644,974 B2 * | 1/2010 | Theuerkauf | 296/107.16 |
| 7,650,719 B2 * | 1/2010 | Anders | 49/489.1 |
| 2002/0074822 A1 | 6/2002 | Rothe et al. | |
| 2002/0185886 A1 * | 12/2002 | Obendiek | 296/108 |
| 2005/0127708 A1 | 6/2005 | Richter et al. | |
| 2006/0249978 A1 | 11/2006 | Rosler et al. | |
| 2007/0024081 A1 | 2/2007 | Queveau et al. | |
| 2008/0061593 A1 | 3/2008 | Beierl et al. | |
| 2009/0108623 A1 * | 4/2009 | Haberl et al. | 296/109 |

FOREIGN PATENT DOCUMENTS

| | | |
|---|---|---|
| DE | 10042460 A1 | 3/2002 |
| DE | 10051436 A1 | 5/2002 |
| DE | 10147017 A1 | 4/2003 |
| EP | 0713794 A1 | 5/1996 |
| WO | 9700180 A1 | 1/1997 |
| WO | 2005047037 A1 | 5/2005 |

OTHER PUBLICATIONS

European Search Report dated Apr. 15, 2010.

* cited by examiner

Primary Examiner — Jason S Morrow

(57) ABSTRACT

A top for a convertible, which has a rear window frame with a rear window and, in the closed state, at least one roof section situated in front of the rear window frame in the direction of travel. When there are two roof sections which are adjacent to each other when the top is closed, a respective extension, which is extended to the rear or front, is formed on the lateral border regions of one of the roof sections. The extension being configured as a seal carrier.

7 Claims, 2 Drawing Sheets

US 7,934,765 B2

TOP FOR A CONVERTIBLE

CROSS-REFERENCE TO RELATED APPLICATION

This application is a continuation-in-part of co-pending U.S. patent application Ser. No. 11/852,405, filed on Sep. 10, 2007, and claims priority from that application under 35 U.S.C. §120 and also from German application DE 10 2006 042 289.9, filed Sep. 8, 2006, under 35 U.S.C. §119; the prior applications being incorporated herein by reference in their entireties.

BACKGROUND OF THE INVENTION

Field of the Invention

The present invention relates to a top for a convertible, which can be put away in a rear region of the convertible.

European patent EP 0 713 794 B1, corresponding to U.S. Pat. No. 5,669,656, discloses a top for a convertible, which can be put away in a rear region of the convertible and which has a rear window frame with a rear window and, in the closed state, at least one roof section situated in front of the rear window frame in the direction of travel. The top is primarily composed of a top framework and a top cloth, with the top cloth and sealing strips being kept in position on lateral frame parts of the top framework. In this case, the connections for the top cloth and the sealing strips are provided separately from one another on the lateral frame parts of the top framework, with a lug-shaped partial region, which faces the top cloth, of a wall section forming the outer skin of the vehicle body being configured in such a manner that it forms a rain channel together with the adjacent top cloth which is situated further to the inside.

It is disadvantageous here that sealing between the top cloth and side windows of the convertible is complicated structurally and, as a result, expensive.

BRIEF SUMMARY OF THE INVENTION

It is accordingly an object of the invention to provide a top for a convertible which overcomes the above-mentioned disadvantages of the prior art devices of this general type, which provides an improved sealing concept between the top and the side window of the convertible.

With the foregoing and other objects in view there is provided, in accordance with the invention, a top for a convertible to be put away in a rear region of the convertible. The top contains a rear window frame having a rear window, and roof sections situated in front of the rear window frame in a direction of travel in a closed state of the top. When two of the roof sections are adjacent to each other when the top is closed, one of the roof sections has extensions extending from a rear or a front of the one roof section. The extensions are each formed on a lateral border region of the one roof section, and the extensions are a seal carrier for a seal which, when the top is closed, is placed between the roof sections and a side window.

The invention is based on the general concept of offsetting a separating plane of roof sections of the top, which butt against each other when the top is closed, with respect to a separating plane of sealing sections which butt against each other when the top is closed. For this purpose, when there are two roof sections which are adjacent to each other when the top is closed, a respective extension, which is extended to the rear or front, is provided on the lateral border regions of one of the two roof sections, the extension being configured as a carrier for a seal situated between the associated roof section and a side window when the top is closed. By use of the extension which is disposed according to the invention on the respective roof section, the separating plane of the lateral seals is placed in front of or behind the separating plane of the associated roof sections in the direction of travel, thus making it possible, in particular, to sort out a problem with regard to the connection of a top linkage in the region of the separating plane of the roof sections. Experience has shown that, on each of the two roof sections, it is precisely in the region of abutment of the two roof sections that one or more components of the associated top linkage is or are connected to the respective roof sections, as a result of which this region is already configured in a complicated manner in terms of structure. If a separation of the seals would additionally have to be realized here, this would cause further structural difficulties, and therefore the approach according to the invention, namely of offsetting the separating plane of the seals with respect to the separating plane of the roof sections, is particularly imaginative, since, by this measure, these problem zones can be sorted out structurally.

The respective extension is expediently configured as a tensioning element for a covering which at least partially covers the top. By this measure, the extension according to the invention can fulfill two tasks. First, the respective extension carries the associated seal and keeps the latter away from the already structurally complicated separating plane between the individual roof sections and, second, the extension, which is configured as a tensioning element, can at the same time take on the task of producing and shaping an outer contour of the roof, as a result of which the extension according to the invention can fulfill a plurality of functions.

It goes without saying that the features mentioned above and those which have yet to be explained below can be used not only in the respectively stated combination but also in different combinations or on their own without departing from the scope of the present invention.

Other features which are considered as characteristic for the invention are set forth in the appended claims.

Although the invention is illustrated and described herein as embodied in a top for a convertible, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
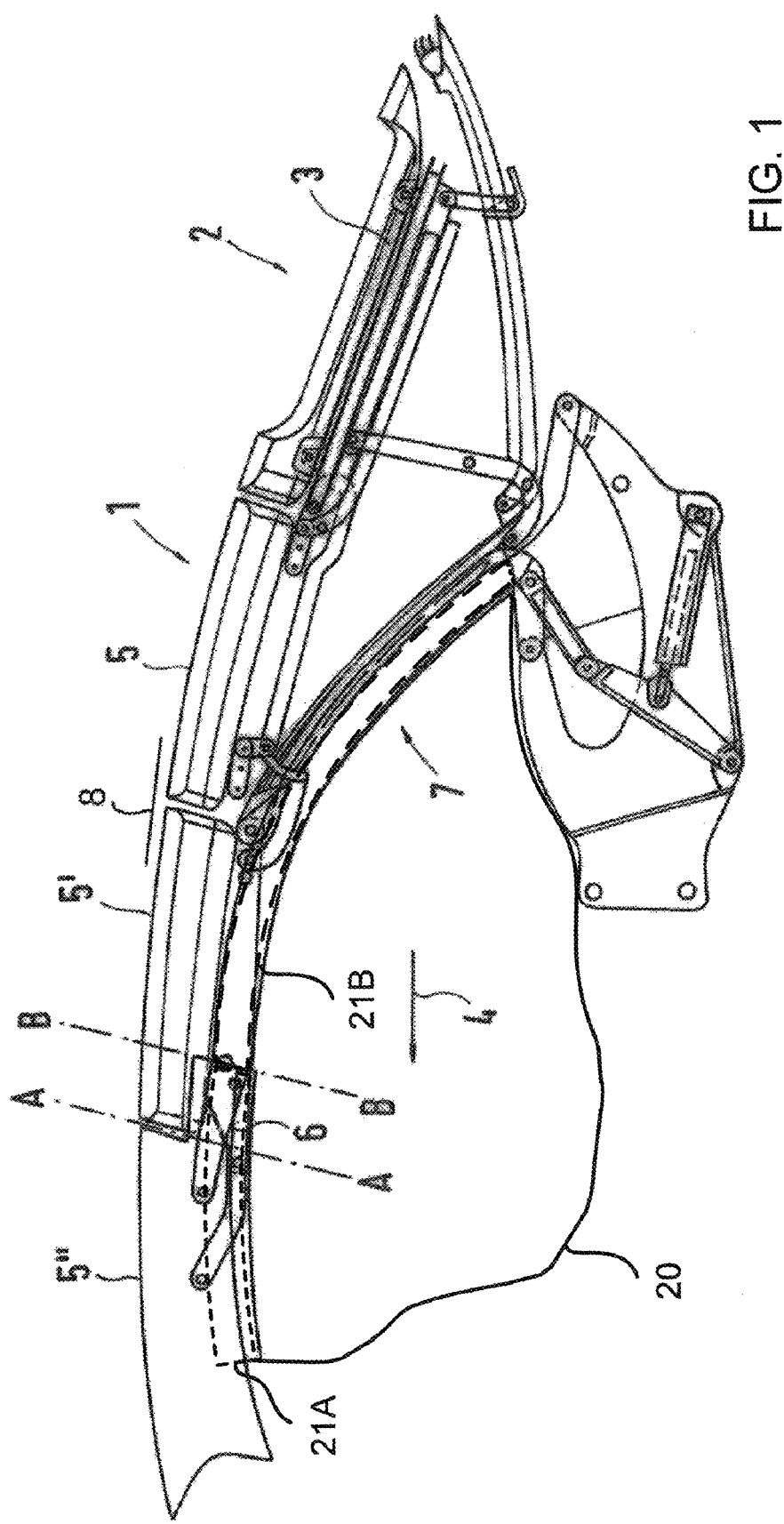
FIG. 1 is a diagrammatic, side view of a top according to the invention in a closed state.

Referring now to the figures of the drawing in detail and first, particularly, to FIG. 1 thereof, there is shown a top 1 which can be opened of a convertible (otherwise not shown), and put away in a rear region of the convertible in a customary manner, in particular in a non-illustrated top compartment. In its rear region, the top 1 has a rear window frame 2 with a rear window 3 and, according to the illustrations according to FIGS. 1 and 2, at least one roof section 5 which is situated in front of the rear window frame in a direction of travel 4. In the case of the variant embodiment of the top 1 according to the invention, which embodiment is shown in FIGS. 1 and 2, a total of three roof sections 5, 5', 5" are provided in front of the rear window frame 2 in the direction of travel 4, with the front most roof section 5" in the direction of travel 4 being configured as an integral roof frame 5" and the roof section 5' situated behind it being configured as a first surface bow or shell 5'.

A second surface bow 5 is disposed between the first surface bow 5' and the rear window frame 2, which surface bow is displaced under the rear window frame 2 during an opening movement of the top 1 while the first surface bow 5' and the integral roof frame 5" are displaced above the rear window frame 2. In the put-away or lowered state, the second surface bow 5 is put away below and the first surface bow 5' and the integral roof frame 5" are put away above the rear window frame in the rear region of the convertible.

According to the invention, at least when there are two roof sections 5", 5' which are adjacent to each other when the top 1 is closed, a respective extension 6, which is extended to the rear or front, is formed on the lateral border regions of one of the two roof sections 5". The extension 6 serves as a seal carrier for a seal 21A which is situated between the associated roof section 5" and a side window 20 when the top 1 is closed.

Figure 2:
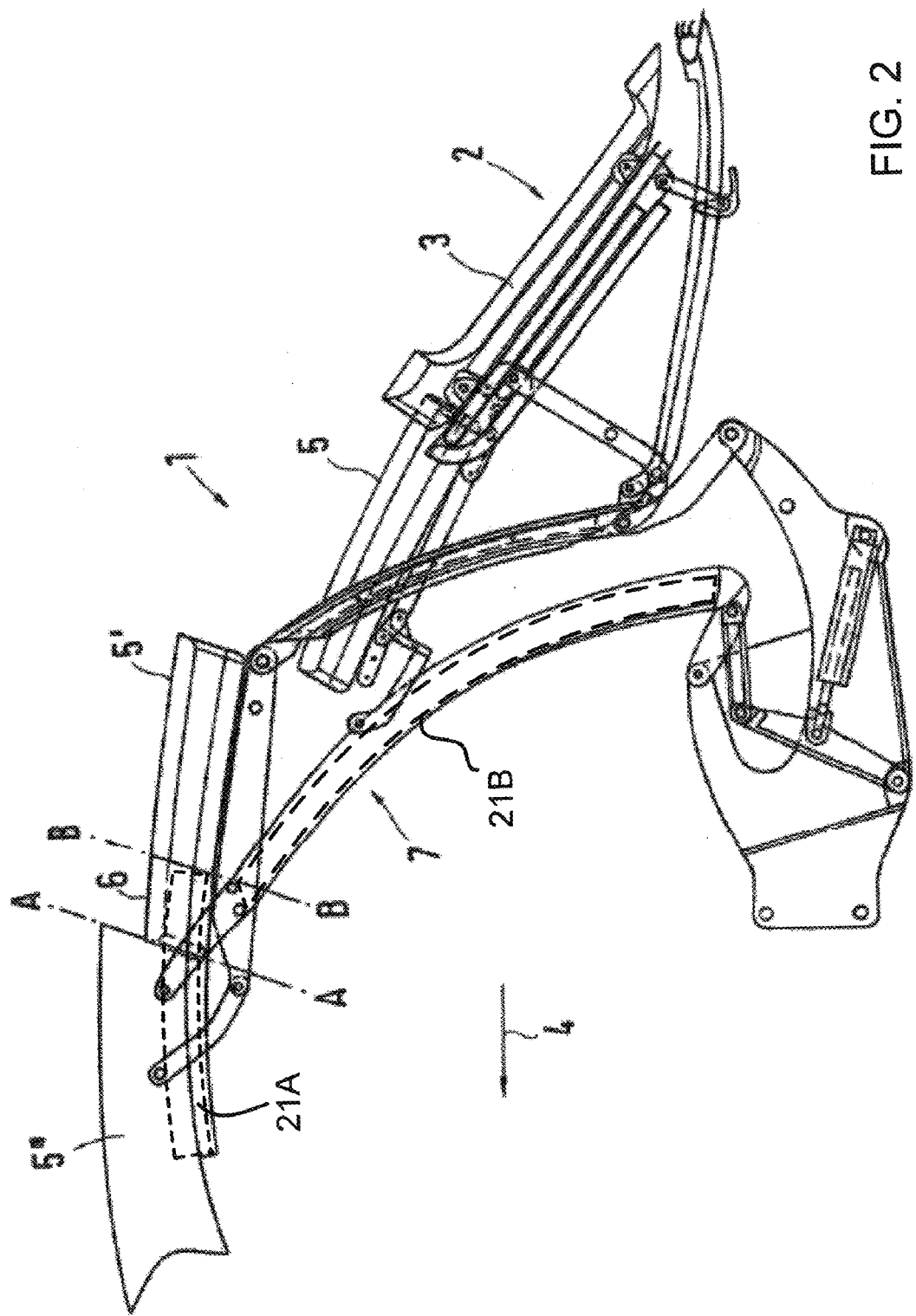
FIG. 2 is a diagrammatic, side view of the top in a partially open state.

FIG. 2 shows the top 1 according to the invention in a slightly open (lowered) position, in which the integral roof frame 5" is already beginning to slide, like the first surface bow 5', over the second surface bow 5 and over the rear window frame 2. It can be seen in FIG. 2 as in FIG. 1 that the front most roof section 5", i.e. the integral roof frame 5", has extensions 6 which protrude to the rear and which are laterally adjacent to the roof section 5' situated behind it, i.e. to the first surface bow 5'. Only the roof extension 6, which can be seen perspectively, is shown in this case while the roof extension situated on an opposite side of the top 1 is not illustrated.

It can furthermore be seen in FIG. 2 that, in the case of the top 1 according to the invention, a separating plane A-A between the integral roof frame 5" and the first surface bow 5' does not coincide with a seal separating plane B-B. On the contrary, the seal separating plane B-B for the seals 21A, 21B disposed laterally on the roof extension are provided behind the separating plane A-A for the respectively associated and adjacent roof sections 5" and 5' in the direction of travel. In the separating plane A-A, the roof sections 5' and 5", which are situated adjacent to the separating plane A-A, butt against each other when the top 1 is closed while, in the separating plane B-B, the lateral seals 21A, 21B butt against each other on the end side in the direction of travel 4 when the top 1 is closed. Experience has shown that, in the region of the separating plane A-A between two adjacent roof sections, the roof sections are connected in an articulated manner to a laterally situated top linkage 7, and therefore this region is already severely stressed or heavily occupied structurally. The invention therefore proposes to place the separating plane B-B for the laterally extending seals 21A, 21B between the roof sections and the side windows in front or behind the separating plane A-A for the roof sections in the direction of travel 4, since, as a result, the structurally taxed situation in the region of the separating plane A-A can be relieved.

In an advantageous embodiment of the solution according to the invention, the respective extension 6 is curved about a longitudinal axis of the vehicle and is used at the same time to produce a roof outer contour of the top 1. The lateral roof extension 6 therefore acts as a tensioning element for a covering 8 which at least partially covers the top 1. The extension 6 can therefore, first, sort out the situation with regard to the separating plane A-A which is taxed due to the structural conditions and, second, it can be used at the same time to configure the roof outer contour. It is of particular advantage in this case that the extension 6 produces a stiff and therefore reliable connecting surface for the seals which also, owing to this fact, can obtain an improved sealing action with the associated side window.

As is furthermore apparent from FIGS. 1 and 2, the extension 6 which is extended to the rear in the direction of travel 4 is only disposed on the integral roof frame 5" while the surface bow 5, 5' situated between the integral roof frame 5" and the rear window frame 2 does not have any such roof extension 6. Sealing between the two surface bows 5, 5' and an associated side window takes place here in a customary manner via a weather strip which is tensioned, for example, by a tensioning cable and is enclosed by an enclosing band. The omission of the roof extensions 6 on the surface bows 5, 5' means that the latter are of narrower configuration than the integral roof frame 5" in the transverse direction of the vehicle. However, this narrow configuration affords the advantage that the second surface bow 5 can be displaced between the top linkage 7 and the rear window frame 2 during opening of the top 1. At the same time, when the top 1 is put away, the roof extensions 6 on the integral roof frame 5" at least partially cover the lateral top linkage 7 and engage over a lateral border region of the first surface bow 5', as a result of which the latter can be put away in its storage position below the integral roof frame 5" in a particularly space-saving manner.

In order to be able to prevent rain water from draining into the side window region when the top 1 is closed, a non-illustrated element which forms a rain outlet is disposed laterally in each case on at least one roof section 5, 5', 5". A rain outlet of this type can be formed, for example, from a plastic element or from the fabric of the top 1.

In general, it should finally be noted that FIGS. 1 and 2 only show one embodiment of the top 1, in which only the integral roof frame 5", i.e. the front most roof section 5", has the extension 6 which is extended to the rear. However, the invention is also to include embodiments in which the lateral border regions of any desired roof section 5, 5', 5" have an extension 6 which is extended in the direction of travel 4 or in an opposed direction to the direction of travel 4 and is configured as a seal carrier for a seal situated between the associated roof section and a side window when the top 1 is closed.

The invention claimed is:

1. A top for a convertible to be put away in a rear region of the convertible, the top comprising:
   a rear window frame having a rear window;
   roof sections situated in front of said rear window frame in a direction of travel in a closed state of the top, when two of said roof sections being adjacent to each other when the top is closed a first roof section of said roof sections having extensions extending from one of a rear and a front of said first roof section, said extensions each formed on a lateral border region of said first roof section, said extensions being a seal carrier for a first lateral seals which, when the top is closed, is placed between said roof sections and a side window;
   a top linkage having two links and second lateral seals, said top linkage supporting said first roof section in the closed state;
   said roof sections associated with said extensions butting against each other in a separating plane when the top is closed, said separating plane being offset in the direction of travel with respect to a separating plane in which said first and second lateral seals are provided which are assigned to said extensions and butt against each other in the direction of travel when the top is closed; and a second roof section of said roof sections disposed behind said first roof section being moved below said first roof section during a lowering movement or said first roof section being moved above said second roof section lying behind it during the lowering movement.

2. The top according to claim 1, wherein:

said roof sections include a third roof section, said second and third roof sections being first and second roof bows; and said first roof section is a front most roof section as seen in the direction of travel being an integral roof frame, and said first and second surface bows are disposed behind said front most roof section in the direction of travel.

3. The top according to claim 2 wherein said front most roof section has said extensions protruding rearward.

4. The top according to claim 1, wherein said extensions are curved about a longitudinal axis of the convertible.

5. The top according to claim 1, wherein said extensions are tensioning elements for a covering which at least partially covers the top.

6. The top according to claim 1, wherein said extensions each form a lateral roof contour of the top.

7. The top according to claim 1, wherein said extensions are each laterally adjacent to said one roof section situated behind it.

* * * * *